Figure 1:
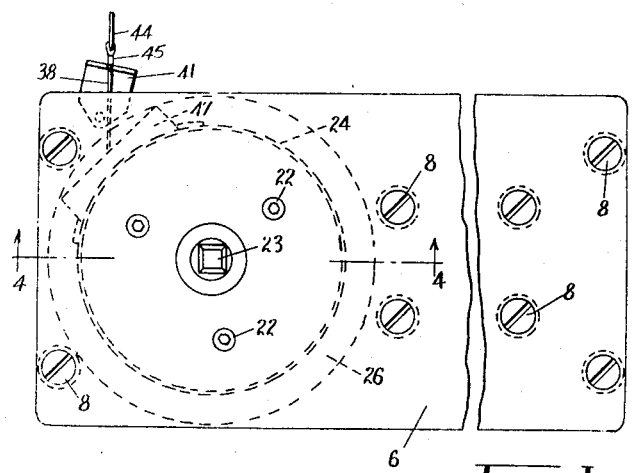

Jan. 6, 1959  L. GUILBAULT  2,867,250
DISC CUTTING ATTACHMENT FOR BAND SAWS
Filed March 19, 1957  3 Sheets-Sheet 1

INVENTOR
LUCIEN GUILBAULT

By Fetherstonhaugh & Co.
Attorneys

Jan. 6, 1959 L. GUILBAULT 2,867,250
DISC CUTTING ATTACHMENT FOR BAND SAWS
Filed March 19, 1957 3 Sheets-Sheet 2
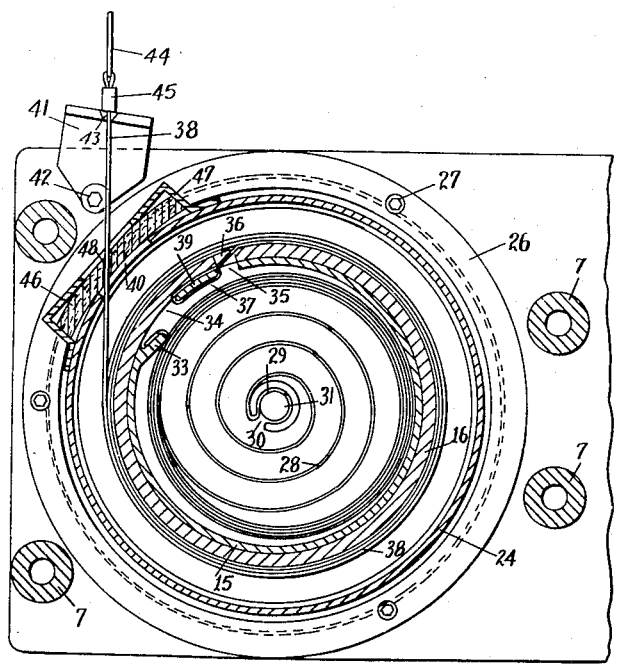
Fig. 3
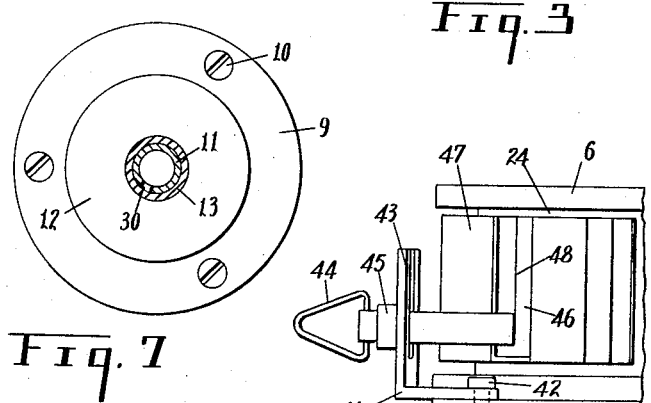
Fig. 7
Fig. 8
INVENTOR
LUCIEN GUILBAULT
By Hetherstonhaugh & Co.
Attorneys

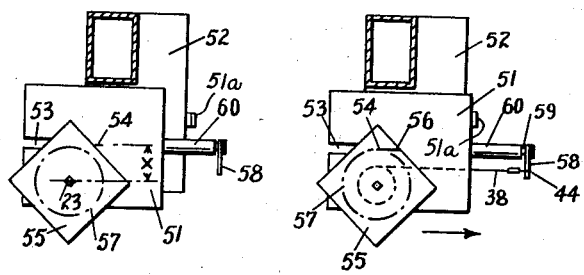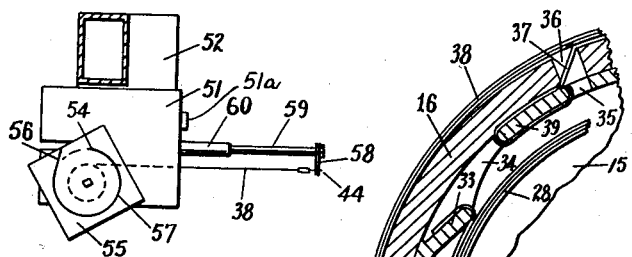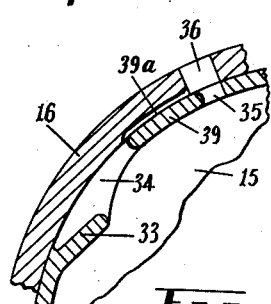

United States Patent Office 2,867,250
Patented Jan. 6, 1959

2,867,250
DISC CUTTING ATTACHMENT FOR BAND SAWS

Lucien Guilbault, Montreal, Quebec, Canada, assignor to The Robert Mitchell Co., Limited, Montreal, Quebec, Canada Application March 19, 1957, Serial No. 647,088

15 Claims. (Cl. 143—26)

This invention relates to disc cutting attachments for band saws, and more particularly to attachments which will carry the work piece blank and can be set up on a band saw table in a position relative to the band saw blade defining the radius of the disc to be cut when the attachment carrying the blank is rotated against the saw blade.

The invention consists of a spring loaded attachment having a rotatable shaft on which the work piece blank is carried. The attachment being clamped to the table of the band saw in a position which will locate the centre of the rotatable shaft at a distance parallel with the cutting edge of the band saw blade equal to the radius of the circular disc to be cut. The cutting of the disc is first started by moving the band saw table, and with it the attachment and the work piece blank, relative to the band saw blade, to make a straight saw cut in the blank which cut will be extended to the tangent of the circle to be cut. At this point the travel of the table is stopped. The spring loaded attachment is connected with an extensible arm of the band saw. The extensible arm, which is normally mounted on the bandsaw table, is usually worked hydraulically and is controlled by means of a push button. Outward movement of the extensible arm effects rotation of the attachment causing the work piece blank to be rotated against the saw blade to complete the cutting of the disc.

The object of the invention is to provide an attachment which can be mounted on cutting machines for the purpose of cutting circular discs smoothly and accurately under automatic conditions.

A further object of the invention is to provide an attachment for the cutting of circular discs which, once set up for the diameter of the disc to be cut, will allow for the cutting of large quantities of discs without attention other than feeding and removing the blanks from the attachment, and the push button operation of the machine.

A further object of the invention is to provide a spring loaded disc cutting attachment which will, on release of the hydraulic power effecting rotation of the blank against the saw blade, unwind the attachment in readiness for the next disc to be cut.

A further object of the invention is to provide a spring loaded disc cutting attachment in which a steel tape provides the flexible connection between the attachment and the hydraulic operating mechanism.

A further object of the invention is to provide a disc cutting attachment for band saws which can be set with relation to the band saw blade for cutting discs of various diameters, limited only by the space available for clamping the attachment on the machine table.

A further object of the invention is to provide a disc cutting attachment in which the operating tape is kept free of cuttings from the saw thus preventing any build up of cuttings on the rotating mechanism.

Figure 2:
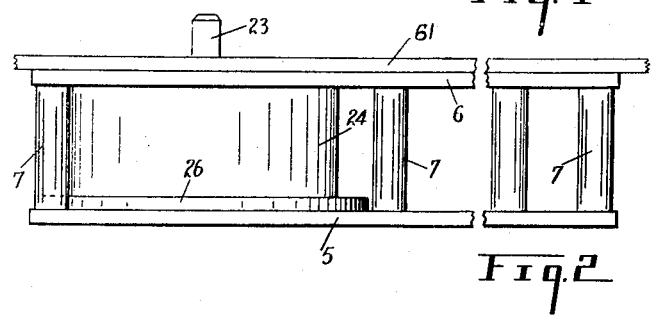
Figure 4:
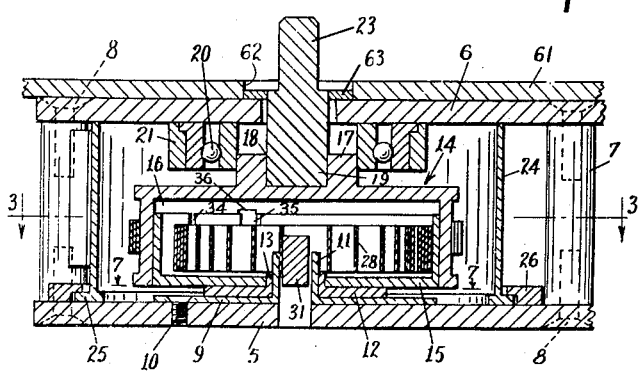

These and other objects of the invention will be apparent from the following specification and the accompanying drawings, in which:

Fig. 1 is a plan view of the disc cutting attachment.
Fig. 2 is a side view of the disc cutting attachment.
Fig. 3 is a sectional plan view on the line 3—3 of Fig. 4 showing the spring loaded drum mechanism and the steel tape for connecting the drum with the hydraulic mechanism of the cutting machine.
Fig. 4 (Sheet 1) is a vertical section on the line 4—4 of Fig. 1.
Fig. 5 (Sheet 3) is an enlarged partial plan view showing the steel tape and spring anchor details of the drum.
Fig. 6 is an enlarged plan view similar to Fig. 5 but showing the steel tape and coil spring anchored to the drum.
Fig. 7 (Sheet 2) is a plan view on the line 7—7 of Fig. 4.
Fig. 8 is a partial side elevation showing the guide bracket and stop for the steel tape operating the spring loaded drum.
Fig. 9 is a diagram showing the setting of the blank with respect to the saw blade before cutting is started.
Fig. 10 is a diagram similar to Fig. 9 but showing the table moved in the direction of the arrow for the straight saw cut, bringing the saw blade tangent with the circle to be cut.
Fig. 11 is a diagram similar to Fig. 10 but showing the hydraulically operated arm extended and carrying with it the steel tape and showing the blank rotated to near completion of the circular cut.

Referring to the drawings, the disc cutting attachment, comprises a pair of clamp plates 5 and 6 separated by the posts 7 and held together by the flat headed screws 8. Secured to the top surface of the lower clamp plate 5 is the plate 9 (Figure 4), held in place by the screws 10. This plate 9 is provided with an upwardly projecting sleeve 11 and supports the wear plate 12 which also is provided with a sleeve 13 coaxial with the sleeve 11.

The wear plate 12 provides a bearing for the drum assembly 14. The drum assembly 14 comprises an inner cup-shaped drum 15 and an outer cup shaped drum 16 fitting into each other and securely held together. The outer drum 16 has an upwardly projecting sleeve 17 providing a socket 18 in which is non-rotatably seated the square shaft 19. The outer surface of the sleeve 17 is centered by the ball bearing 20 which has its outer race clamped to the under side of the clamp plate 6 by the clamp ring 21 and held secured by the screws 22 (Figure 1).

The square shaft 19 extends upwards through the upper clamp plate 6 and has a square blank receiving extension 23 of reduced size.

The drum assembly 14 and ball bearing assembly 20 are protected from damage by cuttings etc. by the casing 24 surrounding the drum and bearing and held in place between the upper and lower clamp plates 5 and 6. The casing 24 is provided with an annular flange 25 over which the clamp ring 26 is fitted to secure the casing 24 to the lower clamp plate by the screws 27 (Figure 3).

A torsion spring 28 is fitted inside the drum assembly 14. The inner end 29 of the spring is passed through the slot 30 in the sleeve 11, projecting upwardly from the plate 9, and is wedged inside the sleeve 11 by the plug 31 to anchor the inner end of the torsion spring 28 to the lower plate 5. The outer end of the spring 28 is bent around the finger 33 which projects inwardly from the side wall of the inner drum 15. See Figures 3, 5 and 6.

The inner drum 15 has its side wall slotted at 34 and 35, while the outer drum 16 has its side wall slotted at 36. The slots 35 and 36 coincide with each other and together form a closed end slot through which the inner end 37 of the flexible steel tape 38 is passed. This inner end 37 of the steel stape 38 is bent around and anchored to that part 39 of the side wall of the inner drum 15 between the slots 34 and 35, the part of the inner wall of the outer drum 16 adjacent the part 39 of the inner drum 15 is cut back at 39a to allow the end 37 of the tape to pass between the walls of the two drums. The end 37 of the steel tape passing through the slots 34 and 35 serves to anchor the inner and outer drums 15 and 16 together and ensures that both halves will rotate together when pulled by the steel tape 38. The steel tape 38 is wound around the outer wall of the outer drum 16 for a few turns and is then passed out through the slot 40 in the wall of the circular casing 24.

A bracket 41 is anchored to the lower clamp plate 5 by means of the screw 42. The free end of the flexible steel tape 38 is fed through the slot 43 in the bracket 41 and is provided with a loop 44 and a binding clip 45 which also serves as a stop to prevent the loop 44 of the tape 38 from being pulled tight against the casing 24 by the spring 28 and also serves to keep the loop 44 in a convenient position for pulling on the tape by hand in order to attach the tape to a movable arm on the band saw table.

In order to keep the steel tape 38 free of saw cuttings and prevent any build up of cuttings on the drum 14, a felt pad 46 is fitted into the box 47 secured to the outside of the casing 24 to cover the slot 40 through which the tape 38 passes. The felt is slit at 48 to allow the tape to pass through while excluding any cuttings which may adhere to the tape during the cutting operation.

A loose plate 61 (Figures 2 and 4) is laid on the top of the upper clamp plate 6 and is provided with a relatively loose bore at 62 in which a washer 63 is seated to keep the plate clear of the extension shaft 23. The plate 61 protects the attachment generally free of damage and takes the wear caused by rotation of the work blank when it is fitted over the shaft 23.

In the operation of the invention, the attachment is secured to the table 51 of the band saw 52 which is illustrated diagrammatically in Figs. 9, 10 and 11 with the head piece of the band saw broken off to clearly show the table and the work. The table 51 is movable in a horizontal direction and is slotted at one end at 53 to give clearance for the saw blade 54 in any position of the table.

The location of the attachment on the table 51 is determined by the diameter of the disc to be cut and in Fig. 9 the distance "X" represents the radius of the disc measured from the cutting edge of the saw blade 54 to a line parallel with the side of the saw blade nearest to and passing through the centre of the extension shaft 23.

The disc is cut from the blank plate 55 in the following manner:

A square hole is punched in the centre of the plate 55 to fit the extension shaft 23. The plate 55 is then placed in position on the shaft and the cut is started by moving the table 51 in the direction of the arrow in Fig. 10. The straight cut 56 so formed brings the cutting edge of the saw blade 54 to the tangent of the circle 57 to be cut.

The extensible arm 58 is now moved outwards at a controlled speed and carries with it the tape 38, causing the drum 14 and shaft 23 to revolve and with them, revolving the plate 55 against the saw blade 54 to cut the circle 57. This operation is carried on until the cut circle 57 meets the original straight cut 56 and the disc is cut completely out of the plate 55. During this operation, the torsion spring 28 has been wound up within the drum assembly 14. A reversal of the hydraulic process returns the arm and the table to their original positions during which the tape will be rewound on the drum by spring action ready for the next operation. The cut disc and the trimmed material is then removed and a new blank plate 55 fitted on the shaft 23 and the operation of cutting the discs is repeated as often as required without any further adjustments so long as one size of disc is being cut.

Should the hydraulic cylinder 60 be attached to the table 51, as it is in most types of machines, and not to the body of the band saw 52, the tape 38 can remain hooked to the bracket 58, through any number of disc cutting operations. However, should the hydraulic cylinder not be attached to the table 51 it would then be necessary to remove the tape from the bracket while the straight cut 56 is being made to the blank 55.

The felt pad 46 seals the tape outlet and prevents cuttings from getting into the assembly.

The above cycle of operations is usually carried out by means of push button hydraulic control but it will be realized that the arm 58 could be moved by any other suitable mechanical means or by manual means. For instance, the arm 58 could be moved by means of a rack and pinion or by cam means depending upon the type of cutting machine to which the attachment is fitted. The machine could also be fitted with suitable stop means 51a to stop the horizontal travel of the table as soon as the cutting edge of the saw blade meets the tangent of the circle to be cut.

As the position of the attachment on the table is fixed relative to the saw blade it will be realized that the cut discs produced will be uniform as to size and each be a perfect circle, and finishing of the cut edge of the disc will depend entirely upon the use to which the discs are to be put.

What I claim is:

1. In a disc cutting band saw in combination, a fixed stand, a table horizontally movable on said stand, a band saw blade passing through said table and an extensible arm mounted on said table, a disc cutting attachment secured to said table, in a predetermined position on a line parallel with the cutting line of said band saw blade, said attachment comprising a spring loaded rotatable drum, a shaft extending upwardly from said drum, a blank to be cut, non-rotatably fitted to said shaft, means to move said table along said line relative to said saw blade bringing said blank into cutting engagement with said saw blade, means to stop the travel of said table when the cutting edge of said blade is tangent with the circle to be cut in said blank, a flexible connection between said drum and said extensible arm and means to move said extensible arm relative to said table to effect rotation of said drum and rotate said blank against said band saw blade to complete a circular cut in said blank.

2. In a disc cutting band saw in combination, a fixed stand, a table horizontally movable on said stand, a band saw blade mounted for continuous movement on said stand and passing through said table, an extensible arm mounted on said table, a disc cutting attachment secured to said table in a predetermined position on a line parallel with the cutting line of said band saw blade, said attachment comprising top and bottom plates spaced apart, a spring loaded rotatable drum journalled between said top and bottom plates, a shaft rotatable with said drum and extending upwardly through said top plate, a blank to be cut, non-rotatably fitted to said shaft, means to move said table along said line relative to said saw blade bringing said blank into cutting engagement with said saw blade, means to stop the travel of said table when the cutting edge of said saw blade is tangent with the circle to be cut in said blank, a flexible connection between said drum and said extensible arm and means to move said extensible arm relative to said table to effect rotation of said drum and rotate said blank against said band saw blade to complete a circular cut in said blank.

3. In a disc cutting band saw in combination, a fixed stand, a table horizontally movable on said stand, a band saw blade mounted for continuous movement on said stand and passing through said table, and an extensible arm mounted on said table, a disc cutting attachment secured to said table in a predetermined position on a line parallel with the cutting line of said band saw blade, said attachment comprising top and bottom plates spaced apart, a spring loaded rotatable drum journalled between said top and bottom plates, a shaft rotatable with said drum and extending upwardly through said top plate, a blank to be cut, non-rotatably fitted to said shaft, a flexible tape secured to and wrapped around said drum and having its other end attached to said extensible arm, means to move said table along said line relative to said saw blade bringing said blank into cutting engagement with said saw blade, means to stop the travel of said table when the cutting edge of said saw blade is tangent with the circle to be cut in said blank, and means to move said extensible arm relative to said table and through said flexible tape effect rotation of said drum and rotate said blank against the cutting edge of said saw blade to complete a circular cut in said blank.

4. In a disc cutting band saw in combination, a fixed stand, a table horizontally movable on said stand, a band saw blade mounted for continuous movement on said stand and passing through said table and an extensible arm mounted on said table, a disc cutting attachment secured to said table in a predetermined position on a line parallel with the cutting line of said band saw blade, said attachment comprising top and bottom plates spaced apart, a spring loaded rotatable drum journalled between said top and bottom plates, a shaft rotatable with said drum and extending upwardly through said top plate, a blank to be cut, non-rotatably fitted to said shaft, a flexible tape secured to and wrapped around said drum and having its other end attached to said extensible arm, a casing about said drum, said casing extending between said top and bottom plates and having a slot through which said flexible tape passes, means to move said table along said line relative to said saw blade bringing said blank into cutting engagement with said saw blade, means to stop the travel of said table when the cutting edge of said blade is tangent with the circle to be cut in said blank, and means to move said extensible arm relative to said table and through said flexible tape effect rotation of said drum and rotate said blank against the cutting edge of said saw blade to complete a circular cut in said blank.

5. In a disc cutting band saw in combination, a fixed stand, a table horizontally movable on said stand, a band saw blade mounted for continuous movement on said stand and passing through said table and an extensible arm mounted on said table, a disc cutting attachment secured to said table in a predetermined position on a line parallel with the cutting line of said band saw blade, said attachment comprising top and bottom plates spaced apart, a spring loaded rotatable drum journalled between said top and bottom plates, a shaft rotatable with said drum and extending upwards through said top plate, a blank to be cut, non-rotatably fitted to said shaft, a flexible tape secured to and wrapped around said drum and having its other end attached to said extensible arm, a casing about said drum, said casing extending between said top and bottom plates and having a slot through which said flexible tape passes, a sealing pad around said tape and secured to the outside of said casing, means to move said table along said line relative to said saw blade bringing said blank into cutting engagement with said saw blade, means to stop the travel of said table when the cutting edge of said blade is tangent with the circle to be cut in said blank, and means to move said extensible arm relative to said table and through said flexible tape effect rotation of said drum and rotate said blank against the cutting edge of said saw blade to complete a circular cut in said blank.

6. In a disc cutting band saw in combination, a fixed stand, a table horizontally movable on said stand, a band saw blade mounted for continuous movement on said stand and passing through said table, and an extensible arm mounted on said table, a disc cutting attachment secured to said table in a predetermined position on a line parallel with the cutting line of said band saw blade, said attachment comprising top and bottom plates spaced apart, a drum journalled between said top and bottom plates, a torsion spring within said drum one end of which is secured to said bottom plate and the other end to the periphery of said drum, a shaft rotatable with said drum and extending upwards through said top plate, a blank to be cut, non-rotatably fitted to said shaft, a flexible tape having one end secured to and wrapped around said drum and having its other end attached to said extensible arm, means to move said table along said line relative to said saw blade bringing said blank into cutting engagement with said saw blade, means to stop the travel of said table when the cutting edge of said blade is tangent with the circle to be cut in said blank, and means to move said extensible arm relative to said table and through said flexible tape effect rotation of said drum against the pressure of said spring and rotate said blank against the cutting edge of said saw blade to complete a circular cut in said blank.

7. In a disc cutting band saw in combination, a fixed stand, a table horizontally movable on said stand, a band saw blade mounted for continuous movement on said stand and passing through said table, and an extensible arm mounted on said table, a disc cutting attachment secured to said table in a predetermined position on a line parallel with the cutting line of said band saw blade, said attachment comprising top and bottom plates spaced apart, a drum journalled between said top and bottom plates, a torsion spring within said drum one end of which is anchored to said bottom plate and the other end to the periphery of said drum, a shaft rotatable with said drum and extending upwards through said top plate, a blank to be cut, non-rotatably fitted to said shaft, a flexible tape having one end secured to and wrapped around said drum and having its other end attached to said extensible arm, a fixed casing about said drum, said casing having a slot through which said flexible tape passes, a sealing pad around said tape and secured to said casing, means to move said table along said line relative to said saw blade bringing said blank into cutting engagement with said saw blade, means to stop the travel of said table when the cutting edge of said blade is tangent with the circle to be cut in said blank, and means to move said extensible arm relative to said table and through said flexible tape effect rotation of said drum against the pressure of said spring and rotate said blank against the cutting edge of said saw blade to complete a circular cut in said blank.

8. In a disc cutting band saw in combination, a fixed stand, a table horizontally movable on said stand, a band saw blade mounted for continuous movement on said stand and passing through said table, and an extensible arm mounted on said table, a disc cutting attachment secured to said table in a predetermined position on a line parallel with the cutting line of said band saw blade, said attachment comprising top and bottom plates spaced apart, a drum journalled between said top and bottom plates, a torsion spring within said drum one end of which is anchored to said bottom plate and the other end to the periphery of said drum, a shaft rotatable with said drum and extending upwards through said top plate, a blank to be cut, non-rotatably fitted to said shaft, a flexible tape having one end secured to and wrapped around said drum and having its other end attached to said extensible arm, a fixed casing about said drum, said casing having a slot through which said flexible tape passes, a sealing pad around said tape and secured to said casing, and a bracket on said attachment, said bracket forming a guide for said flexible tape and a stop holding the free end of said tape against the pressure of the torsion spring when the tape is not attached to the extension arm, means to move said table along said line relative to said saw blade bringing said blank into cutting engagement with said saw blade, means to stop the travel of said table when the cutting edge of said saw blade is tangent with the circle to be cut in said blank, and means to move said extensible arm relative to said table and through said flexible tape effect rotation of said drum against the pressure of said spring and rotate said blank against the cutting edge of said saw blade to complete a circular cut in said blank.

9. In a disc cutting attachment for band saws comprising a table member mounted for reciprocating movement in a straight line, a frame supported on said table, a spring loaded drum journalled in said frame, a shaft rotatable with said drum and projected through said frame to carry a blank to be cut, and a flexible tape secured to and wrapped around said drum, said tape when pulled rotating said drum and shaft relative to said table and frame and against the pressure of said spring.

10. In a disc cutting attachment for band saws comprising a table member mounted for reciprocating movement in a straight line, a frame, supported on said table, a drum journalled in said frame, a torsion spring in said drum one end of which is anchored to said frame and the other end to the drum, a shaft rotatable with said drum and projected through said frame to carry a blank to be cut, and a flexible tape secured to and wrapped around said drum, said tape when pulled rotating said drum and shaft relative to said table and frame and against the pressure of said torsion spring.

11. In a disc cutting attachment for band saws comprising a table member mounted for reciprocating movement in a straight line, a frame supported on said table, a casing forming part of said frame, a drum within said casing and journalled in said frame, a torsion spring in said drum, one end of which is anchored to said frame and the other end to the drum, a shaft rotatable with said drum and projected through said frame to carry a blank to be cut, and a flexible tape secured to and wrapped around said drum and having its free end passing through the wall of said casing, said tape when pulled rotating said drum and shaft relative to said table and frame and against the pressure of said torsion spring.

12. In a disc cutting attachment for band saws comprising a table member mounted for reciprocating movement in a straight line, a frame support on said table, a casing forming a part of said frame, a drum within said casing and journalled in said frame, a torsion spring in said drum, one end of which is anchored to said frame and the other end to the drum, a shaft rotatable with said drum and projected through said frame to carry a blank to be cut, a flexible tape secured to and wrapped around said drum and having its free end passing through the wall of said casing and a sealing pad about said tape and secured to the wall of said casing, said tape when pulled rotating said drum and shaft relative to said table and frame and against the pressure of said torsion spring.

13. In a disc cutting attachment for band saws comprising a table member mounted for reciprocating movement in a straight line, a frame support on said table, a casing forming a part of said frame, a drum within said casing and journalled in said frame, a torsion spring in said drum, one end of which is anchored to said frame and the other end to the drum, a shaft rotatable with said drum and projected through said frame to carry a blank to be cut, a flexible tape secured to and wrapped around said drum and having its free end passing through the wall of said casing, a sealing pad about said tape and secured to the wall of said casing, and a bracket secured to said frame holding the free end of said tape clear of said casing against the pressure of the torsion spring, said tape when pulled rotating said drum and shaft relative to said table and frame and against the pressure of said torsion spring.

14. In a disc cutting attachment for band saws comprising a table member mounted for reciprocating movement in a straight line, a frame supported on said table, said frame comprising a pair of top and bottom plates spaced apart, a casing secured between said top and bottom plates, a drum within said casing and journalled in said frame, a torsion spring in said drum, one end of which is anchored to said bottom plate and the other end to the drum, a shaft rotatable with said drum and projected through said top plate to carry a blank to be cut, a flexible tape secured to and wrapped around said drum and having its free end passing through the wall of the casing, a sealing pad about said tape and secured to the wall of said casing, a loop on the end of said flexible tape, and a bracket secured to said frame, said bracket holding the loop of said tape clear of said casing against the pressure of the torsion spring, said tape when pulled rotating said drum and shaft relative to said table and frame and against the pressure of said torsion spring.

15. In a disc cutting attachment for band saws comprising a frame, a casing forming a part of said frame, a hollow drum within said casing and journalled in said frame, said drum being formed of a pair of cup shaped members fitting over each other to form the hollow drum, a torsion spring in said drum, one end of which is anchored to said frame and the other end to the wall of the inner cup member of the drum, a shaft rotatable with said drum and projected through said frame to carry a blank to be cut, a flexible tape passing through a slot in the outer cup member of the drum and being anchored to the inner cup member of the drum and thence wrapped around the outer cup member and having its free end passing through the wall of said casing, a sealing pad about said tape and secured to the wall of said casing, and a bracket secured to said frame holding the free end of said tape clear of said casing against the pressure of the torsion spring, said tape when pulled rotating said drum and shaft relative to said frame and against the pressure of said torsion spring.

References Cited in the file of this patent

UNITED STATES PATENTS

| 300,975 | Hopkins | June 24, 1884 |
| 2,394,789 | Lavoie | Feb. 12, 1946 |
| 2,594,277 | Barto | Apr. 29, 1952 |
| 2,625,965 | Crane | Jan. 20, 1953 |
| 2,678,070 | Davis | May 11, 1954 |
| 2,745,447 | Studley | May 15, 1956 |